United States Patent
Brueckner et al.

(10) Patent No.: US 9,463,834 B2
(45) Date of Patent: Oct. 11, 2016

(54) FASTENING DEVICE AND ALIGNING METHOD FOR MOUNTING PARTS OF VEHICLES

(71) Applicant: HBPO GmbH, Lippstadt (DE)

(72) Inventors: Reinhold Brueckner, Herzebrock-Clarholz (DE); Steffanie Neuhaus, Delbrueck (DE)

(73) Assignee: HBPO GmbH, Lippstadt (DE)

( * ) Notice: Subject to any disclaimer, the term of this patent is extended or adjusted under 35 U.S.C. 154(b) by 333 days.

(21) Appl. No.: 14/165,836

(22) Filed: Jan. 28, 2014

(65) Prior Publication Data

US 2014/0212202 A1    Jul. 31, 2014

(30) Foreign Application Priority Data

Jan. 30, 2013   (DE) .................. 10 2013 100 915

(51) Int. Cl.
*F16G 11/00* (2006.01)
*B62D 65/02* (2006.01)
(Continued)

(52) U.S. Cl.
CPC .......... *B62D 65/024* (2013.01); *B62D 25/085* (2013.01); *B25B 27/00* (2013.01); *B25B 27/02* (2013.01); *B60Q 1/045* (2013.01); *B60Q 1/0483* (2013.01); *B62D 25/00* (2013.01); *B62D 25/08* (2013.01); *Y10T 403/1624* (2015.01)

(58) Field of Classification Search
CPC ..... B25B 27/002; B25B 27/00; B25B 27/02; B62D 25/08; B62D 25/00; B62D 65/024; B62D 25/085; B60Q 1/045; B60Q 1/0483
USPC ................................ 403/14, 11, 13; 362/549
See application file for complete search history.

(56) References Cited

U.S. PATENT DOCUMENTS 4,947,306 A * 8/1990 O'Shaughnessey . B60Q 1/0683
                                                    362/271
5,253,944 A * 10/1993 Preston .................. B64G 1/646
                                                    244/173.3
(Continued)

FOREIGN PATENT DOCUMENTS

| DE | 102005057116 A1 | 5/2007 |
| DE | 102008020304 A1 | 10/2009 |
| WO | 2012120046 A1 | 9/2012 |

OTHER PUBLICATIONS

Search Report dated Jul. 31, 2013, in German Application No. DE 102013100915.8.
(Continued)

*Primary Examiner* — Chi Q Nguyen
(74) *Attorney, Agent, or Firm* — Patent Central LLC; Stephan A. Pendorf (57) ABSTRACT

A device for aligning mounting parts on a vehicle body having a mounting structure extending in the transverse direction of the vehicle, having a holding unit fastened to the mounting structure, to which holding unit at least one mounting part can be attached via fastening means and can be aligned via aligning means relative to a further mounting part in an adjustment direction, wherein as alignment means a linear control element is provided which is connected to the mounting structure in an axially-secure manner and is adjustable in the adjustment direction relative to a holding body of the holding unit engaged with the linear control element, and that the fastening means is arranged at a location remote from the alignment means.

13 Claims, 6 Drawing Sheets

(51) Int. Cl.
*B60Q 1/04* (2006.01)
*B62D 25/08* (2006.01)
*B25B 27/00* (2006.01)
*B62D 25/00* (2006.01)
*B25B 27/02* (2006.01)

(56) References Cited

U.S. PATENT DOCUMENTS

| | | | | |
|---|---|---|---|---|
| 7,014,257 | B2* | 3/2006 | Lazzeroni | B25B 27/0035 296/193.09 |
| 7,286,340 | B2* | 10/2007 | Karim | H02B 1/042 200/294 |
| 7,478,504 | B2* | 1/2009 | Huebner | E04B 2/7453 248/222.51 |
| 8,746,783 | B2* | 6/2014 | Townson | B62D 25/085 296/193.09 |
| 2003/0230044 | A1* | 12/2003 | Peterson | B60R 13/0206 52/716.5 |
| 2004/0124658 | A1* | 7/2004 | Wheatley | B60J 7/102 296/98 |
| 2005/0023864 | A1 | 2/2005 | Lazzeroni et al. | |
| 2005/0088015 | A1 | 4/2005 | Kishikawa et al. | |
| 2009/0146460 | A1* | 6/2009 | Caporali | B60D 1/00 296/193.03 |
| 2009/0267384 | A1 | 10/2009 | Ritz | |
| 2010/0124457 | A1* | 5/2010 | Cook | B60N 2/01558 403/409.1 |
| 2011/0163562 | A1* | 7/2011 | Smith | B60R 13/0206 296/1.07 |
| 2012/0077137 | A1 | 3/2012 | Schmidt | |
| 2012/0086237 | A1* | 4/2012 | Raulf | B60R 19/18 296/193.09 |

OTHER PUBLICATIONS

European Search Report dated May 13, 2014, in EP Application No. 14 15 0708.

* cited by examiner

FASTENING DEVICE AND ALIGNING METHOD FOR MOUNTING PARTS OF VEHICLES

BACKGROUND OF THE INVENTION

1. Field of the Invention

The invention relates to a device for aligning mounting parts on a vehicle body having a mounting structure extending in the transverse direction of the vehicle, having a holding unit fastened to the mounting structure, to which holding unit at least one mounting part can be attached via fastening means and can be aligned via aligning means relative to a further mounting part in an adjustment direction.

The invention further relates to a method for aligning at least two mounting parts on a vehicle body, wherein a bumper cover is attached as a mounting part via a holding unit to a mounting structure extending in the transverse direction of the vehicle and fastened to the body, and is aligned by actuating a control element in the adjustment direction.

2. Description of the Related Art

DE 10 2008 020 304 A1 discloses a fastening device for mounting parts on a vehicle body, which device allows the fastening and aligning of a mounting part formed as a bumper cover. The bumper cover is fastened to and aligned on an elongate holding unit, wherein the elongate holding unit is fastened to a likewise elongate mounting structure. The mounting structure and the holding unit each extend in the transverse direction of the vehicle. As fastening and aligning means, threaded bushings, which can be aligned in terms of height, are arranged distributed along the holding unit and co-operate with web attachments of the bumper cover. The known fastening device is disadvantageous in that firstly the holding unit is aligned on the mounting structure and only then can the bumper cover be fastened to and aligned on the holding unit. The assembly outlay is relatively large owing to the two aligning processes. Furthermore, only a single mounting part, namely the bumper cover, can be fastened in an aligned manner to the mounting structure by means of the holding unit.

BRIEF SUMMARY OF THE INVENTION

The object of the present invention is thus to develop a device for aligning mounting parts on a vehicle body such that simple and cost-effective assembly is ensured, wherein in particular it is possible to align the mounting part with respect to the body in a simple manner in terms of handling techniques.

In order to achieve the object, as alignment means a linear control element is provided which is connected to the mounting structure in an axially-secure manner and is adjustable in the adjustment direction relative to a holding body of the holding unit engaged with the linear control element, and in that the fastening means is arranged at a location remote from the alignment means.

In accordance with the invention, spatial separation is provided between, on the one hand, the fastening means provided on a holding unit for at least one mounting part and, on the other hand, the aligning means. Whilst the fastening means of the holding unit are used to fix or support at least one mounting part, e.g., a bumper cover and a headlight housing, alignment or joint adjustment with respect to a further mounting part, e.g., an engine bonnet, can be effected by actuating the aligning means. The aligning means comprises a linear control element connected to the mounting structure in an axially-secure manner, so that merely a single alignment of the at least one mounting part is required. Alignment of the holding unit is not required. The assembly and alignment outlay can thus be considerably reduced.

In accordance with one development of the invention, the linear control element is formed as a threaded pin, wherein a head of the threaded pin is fixed in an axially-secure manner by means of a fixing element fixedly connected to the mounting structure. A shaft of the threaded pin is engaged in a threaded bore of a holding body of the holding unit so that the holding body by means of the threaded pin specifying the adjustment direction is mounted so as to be displaceable with respect to the mounting structure. By actuating the threaded pin, mounting parts attached to the holding unit can thus be aligned in a simple manner.

In accordance with one development of the invention, the fixing element is connected to the mounting structure by latching into a bearing recess of the mounting structure. The fixing element can be thus be moved into a defined installation position in a simple manner by being clipped in and thus permits a defined arrangement of the holding unit on the mounting structure.

In accordance with one development of the invention, the mounting structure has an aperture which is in the form of a keyhole for example. The aperture permits the provision of guide means which lie for example on an edge of the aperture so that at least one holding body of the holding unit receiving the mounting part is guided in a displaceable manner in the adjustment direction. The mounting part is fixed to the holding body at least in the adjustment direction so that by actuating the threaded pin, precise alignment or joint adjustment is rendered possible. When the adjustment direction is in the vertical direction of the vehicle, the holding body is held by the guide means in a positionally-secure manner in the transverse direction of the vehicle and in the longitudinal direction of the vehicle.

In accordance with one development of the invention, several apertures of the mounting structure are arranged to extend in the vertical direction of the vehicle, wherein the bearing recess for receiving the fixing element is arranged in an upper region. The apertures permit simple attachment of the holding body on the mounting structure on the one hand, and guided displaceability of the holding body in the vertical direction of the vehicle on the other hand.

In accordance with one development of the invention, a head of the threaded pin is arranged in a space between a bore section of the fixing element and an intermediate wall of the mounting structure so that by attaching a tool to the head the threaded pin is rotatable and is displaceable in the adjustment direction owing to the rotationally-fixed bearing of the holding body on the guide surfaces thereof.

In accordance with one development of the invention, the holding body has a reinforcement part which engages into a recess of the mounting part for reinforcing same. If the mounting part is a bumper cover with integrated fog lights, sensors or other components resulting in an increased weight, a stabilised installation position of the bumper cover can thus be achieved.

In accordance with one development of the invention, the holding body is formed such that it is used for fastening and/or supporting at least two mounting parts, e.g., a bumper cover and a headlight housing. In this manner, several mounting parts can be aligned simultaneously by actuating the linear control element.

In accordance with one development of the invention, a holding unit is arranged in corresponding apertures of the mounting structure in each of opposite end regions of the mounting structure. Preferably, the holding units are arranged in a mirror-inverted manner with respect to the longitudinal direction of the vehicle. By virtue of the fact that the holding units are arranged on the mounting structure only partially in the transverse direction of the vehicle, several mounting parts can be held and aligned in a compact and weight-saving manner.

The object of the present invention is also to provide a method for aligning at least two mounting parts on a vehicle body so that mounting and alignment outlay are reduced.

In order to achieve this object, a holding unit is mounted on each of opposite ends of the mounting structure, said holding unit comprising a holding body to which a first mounting part and a second mounting part are fixed at least in the adjustment direction so that by adjusting the control element in the adjustment direction the first mounting part and the second mounting part are simultaneously aligned with respect to a further mounting part of the body.

The particular advantage of the method in accordance with the invention resides in the fact that several mounting parts attached to a mounting structure can be simultaneously aligned in the adjustment direction. The method in accordance with the invention thus allows the mounting parts to be aligned in a simple, rapid and precise manner.

In accordance with one development of the method in accordance with the invention, the second mounting part, preferably a headlight housing receptacle, can be pre-positioned on the mounting structure before the mounting structure is fastened to the body. The second mounting part has to be displaceable in the adjustment direction on the direct fastening points to the mounting structure or through elongate holes. After mounting the holding unit on the mounting structure and attaching or fastening the first and second mounting part on the holding body of the holding unit mounted so as to be displaceable in the adjustment direction, joint adjustment relative to a further mounting part, e.g., a engine bonnet, can be effected.

BRIEF DESCRIPTION OF THE SEVERAL
VIEWS OF THE DRAWINGS

An exemplified embodiment of the invention is explained in more detail hereinafter with the aid of the drawings, in which.

DETAILED DESCRIPTION OF THE
INVENTION

A device for aligning mounting parts on a vehicle body can be provided in the front region or rear region. The exemplified embodiment described hereinafter relates to the alignment and fastening of two mounting parts, namely a bumper cover 1 and a headlight receptacle 7 on an elongate mounting structure 2 which extends in the transverse direction Q of the vehicle and is fastened to longitudinal chassis beams of the vehicle body. The bumper cover 1 and headlight housing receptacle 7 are aligned by means of holding units 3, which are attached to the mounting structure in each of opposite end regions of the mounting structure 2. The figures show by way of example just the holding unit 3 arranged on the left-hand side in the longitudinal direction L of the vehicle. A holding unit formed correspondingly in a mirror-inverted manner is provided on the right-hand side of the mounting structure 2.

The mounting structure 2 is part of a front end module and is used to receive several mounting parts, i.e., for receiving a cooling module, not shown, in addition to the bumper cover 1 and the headlight housing receptacles 7.

Figure 7:
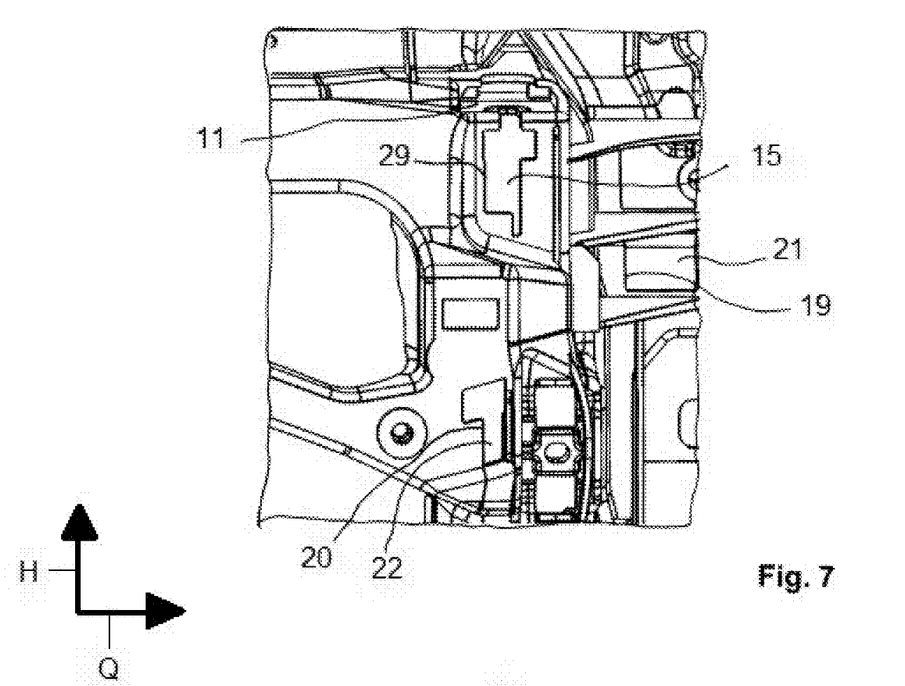
FIG. 7 shows a front view of the mounting structure having apertures for receiving the holding unit.

The mounting structure 2 comprises a main beam section 5 extending in the transverse direction Q of the vehicle and side beam sections 6 which are connected in a perpendicular manner in opposite end regions of the main beam section 5. The side beam sections 6 preferably extend in the vertical direction H of the vehicle.

Figure 1:
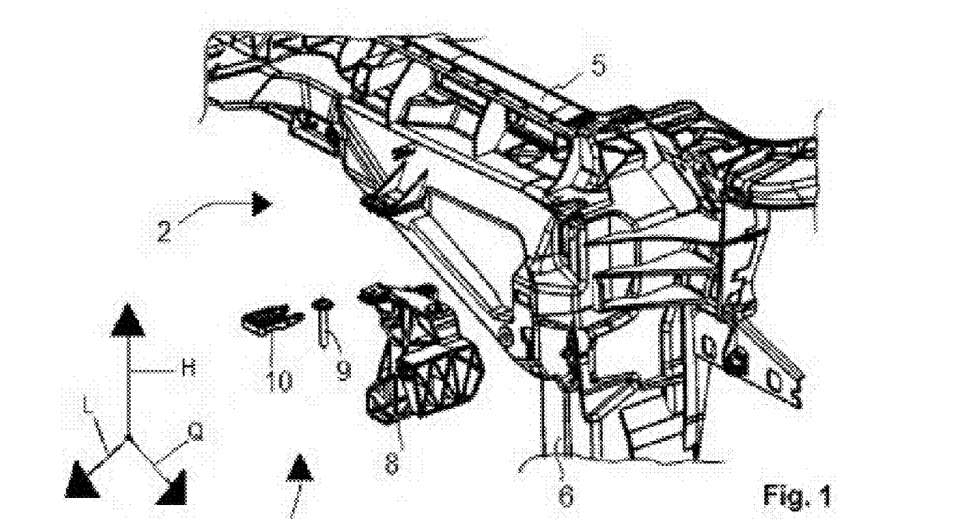
FIG. 1 shows an exploded view of a holding unit for aligning mounting parts upstream of a mounting structure.

The bumper cover 1 and also the headlight housing receptacle 7 are aligned via the common holding unit 3 in an adjustment direction, in the present case the vertical direction H of the vehicle, with respect to a further mounting part, namely an engine bonnet, not shown. The holding unit 3 consists of a holding body 8, a linear control element 9 disposed so as to be linearly displaceable with respect thereto and a fixing element 10 which can be fixedly connected to the mounting structure 2.

In order to fasten the holding unit 3 to the mounting structure 2, the fixing element 10 is arranged to be inserted in a latching manner into a bearing recess 11 of the mounting structure 1. The holding body 8 engages with its protuberances into several apertures 15, 21, 22 in the mounting structure 2. A first protuberance 12 of the holding body 8 has a threaded bore 13 with which a shaft 14 of the control element 9, formed as a threaded pin, is in threaded engagement. In the mounting position, the first protuberance 12 is in a keyhole-shaped aperture 15 which is separated from the bearing recess 11 by an intermediate wall 16. The threaded pin 9 thus extends in the vertical direction (vertical direction H of the vehicle). The apertures 21, 22 are on opposite sides in relation to a longitudinal axis of the threaded pin 9 and are in a lower region with respect to the keyhole-shaped aperture 15.

Figure 3:
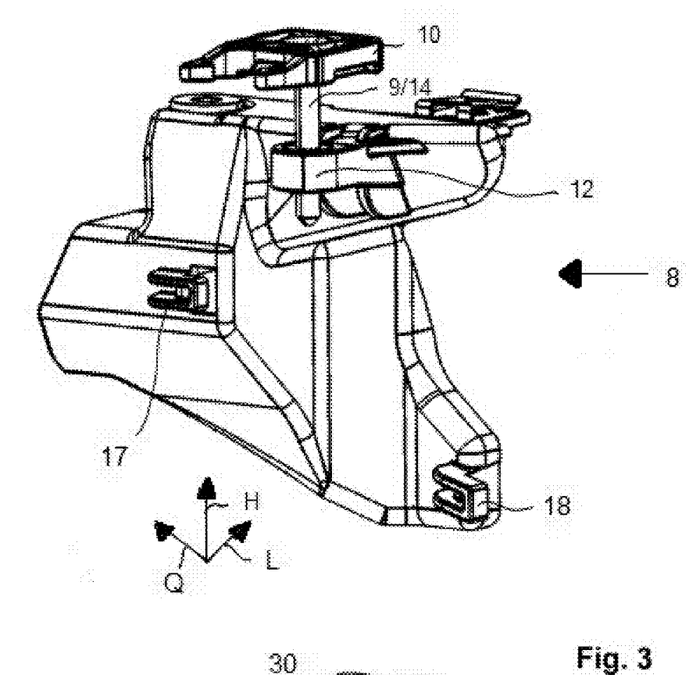
FIG. 3 shows a rear view of the holding unit assembled from several parts.
Figure 4:
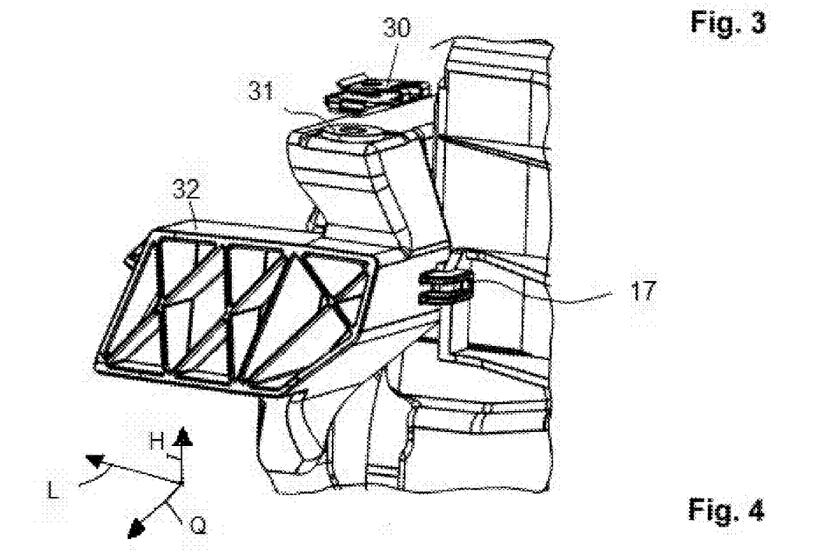
FIG. 4 shows a side view of the holding unit in the mounted state on the mounting structure having guide means on the mounting structure.
Figure 5:
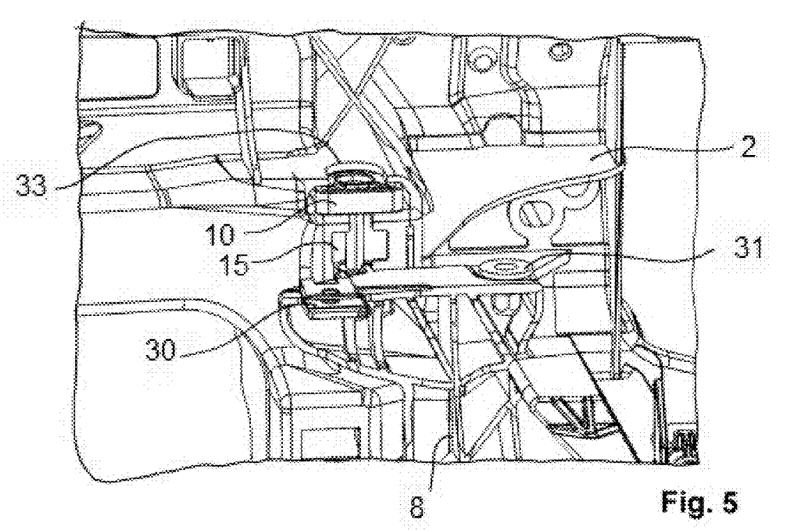
FIG. 5 shows a front view of the holding unit mounted on the mounting structure.

The apertures 15, 21, 22 of the mounting structure 2 are used as guide means for the defined displacement of the holding body 6 in the adjustment direction H. A first guide hook 17 and a second guide hook 18 are arranged on a rear side of the holding body 8 and in the mounting position each engage behind an edge 19 and 20 of the aperture 21 and 22 respectively. These guide means ensure that the holding body 8 is guided in a displaceable and rotationally-fixed manner in the adjustment direction, in the present case the vertical direction H of the vehicle.

Figure 8:
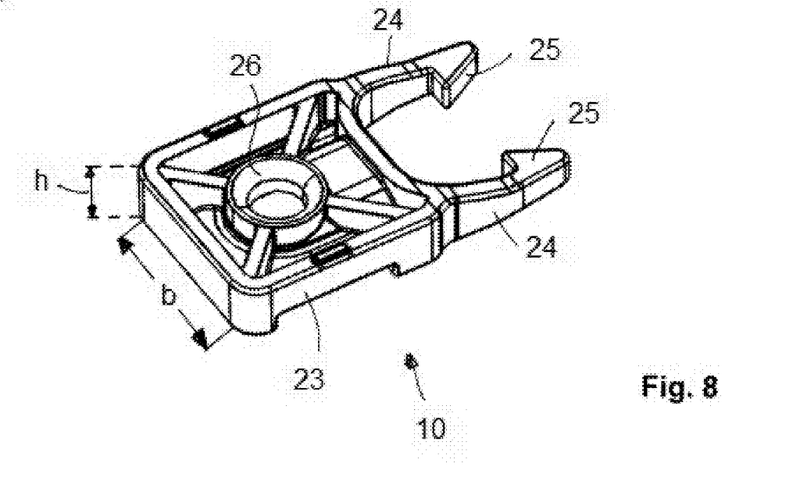
FIG. 8 shows a perspective view of a fixing element which can engage in a latching manner into a bearing recess of the mounting structure.
Figure 9A:
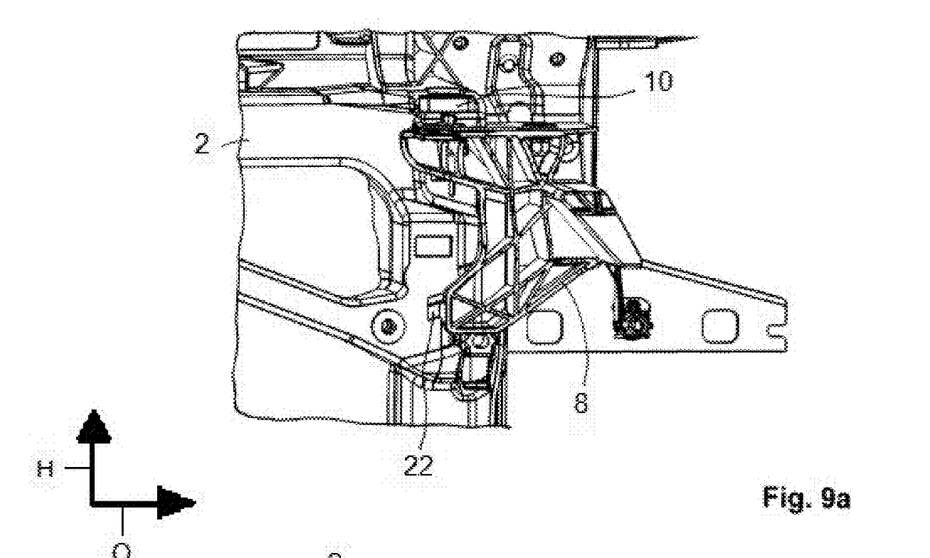
FIG. 9a shows a front view of the holding unit inserted into the mounting structure in an upper position of a holding body of the holding unit receiving the mounting parts.
Figure 9B:
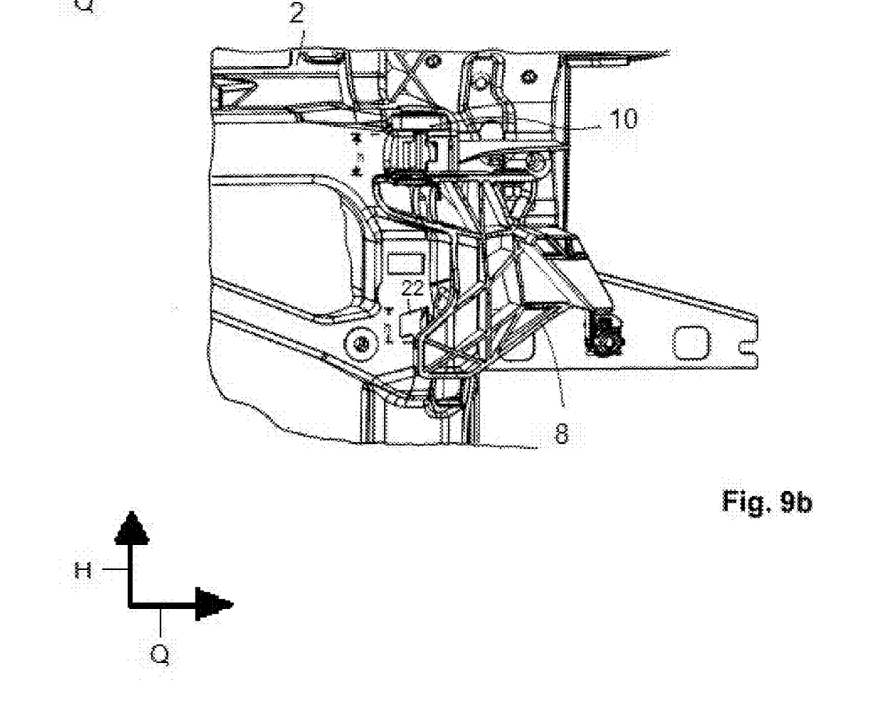
FIG. 9b shows a front view of the holding unit inserted into the mounting structure in a lower position of the holding body.

The insertable fixing element 10 has a main body 23 and latching arms 24 projecting in pairs on a narrow side thereof. The latching arms 24 are formed in a resilient manner transverse to an axis of symmetry of the main body 23 and each engage with their barbed hook-shaped ends 25 into rear openings, not shown, of the bearing recess 11. The barbed hook-shaped ends 25 engage behind the rear wall of the bearing recess 11 so that the fixing element 10 is held on the mounting structure 3 in a latching or clamping manner. A height h and a width b of the main body 23 are formed to be adapted to a height h and a width b of the bearing recess 11 so that the fixing element 10 is connected to the mounting structure 2 in a positionally-secure and fixed manner in the mounted position.

Figure 6:
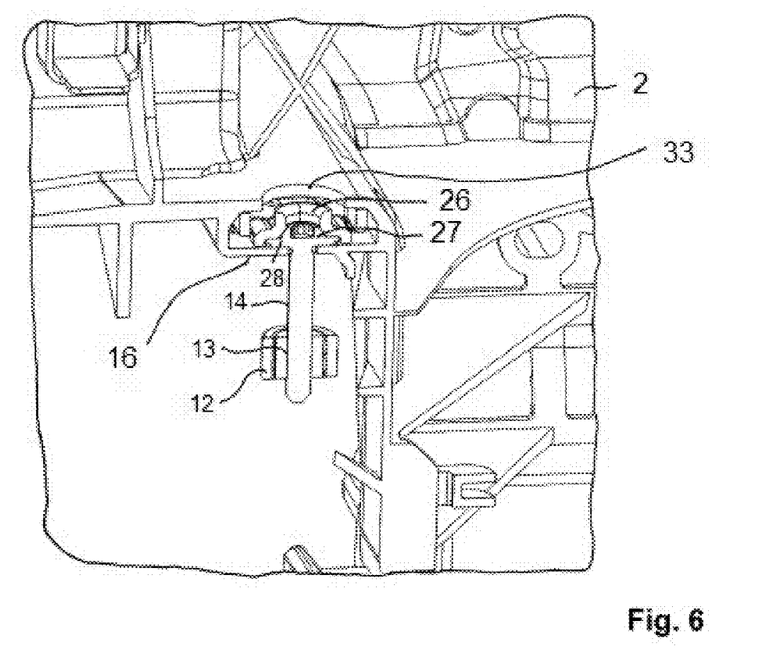
FIG. 6 shows a view of the mounted holding unit on the mounting structure which, in comparison to FIG. 5, is a sectional view on a longitudinal central plane of a threaded pin of the holding unit.

The main body 23 has a central counter bearing part 26 which is adapted to the shape of a head 27 of the threaded pin 9 and ensures that the threaded pin 9 is held in a positionally-secure manner in co-operation with the intermediate wall 16. The head 27 of the threaded pin 9 is surrounded between the counter bearing part 26 and the intermediate wall 16 with sufficient clearance that the threaded pin 9 is arranged in a rotatable but axially-secure manner. The head 27 has a rim 28 which lies directly on the intermediate wall 16. The counter bearing part 26 of the main body 23 lies directly on a side of the rim 28 facing away from the intermediate wall 16.

On the one hand, edges 29 of the first aperture 15 and also the edges 19, 20 of the second aperture 21 and third aperture 22 respectively are used as guide means for adjusting the holding body 8 in the vertical direction H of the vehicle. Since the guide hooks 17, 18 engage behind the edges 19, 20, surfaces of the mounting structure 2 adjoining the edge 19, 20 on the rear side are used as guide surfaces.

Figure 2:
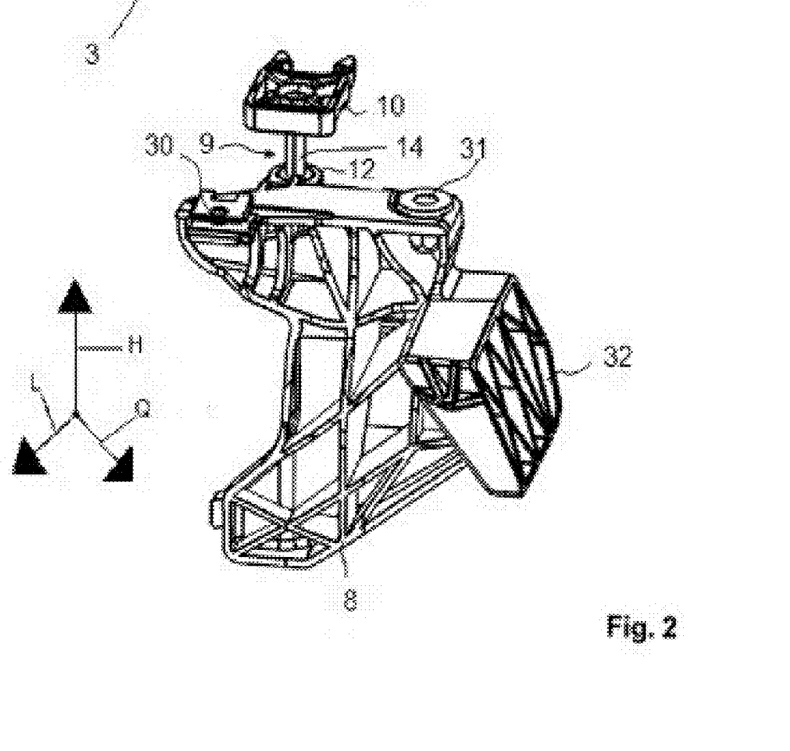
FIG. 2 shows a front view of the holding unit assembled from several parts.

A first fastening point 30 for fastening the bumper cover 1 and a second fastening point 31 for fastening the headlight housing receptacle 7 are provided in an upper region of the holding body 8. The first fastening point 30 is formed as a fastening clamp, into which a web, not shown, of the bumper cover 1 engages and is held in a clamping manner. The fastening clamp is not necessarily used to fasten the bumper cover 1 to the holding body 8. It can also be used merely to support the bumper cover 1 in the vertical direction H of the vehicle. The second fastening point 31 is formed as a threaded bushing to which a fastening strap, not shown, of the headlight housing receptacle 7 can be fixedly connected by screws.

The holding body 8 further comprises a reinforcement part 32 which engages in a positive-locking manner into a recess, not shown, of the bumper cover 1 for reinforcing same. In this manner, the stability of the bumper cover 1, preferably provided with sensors, rear fog lights and the like, can be increased.

The first fastening point 30 and the second fastening point 31 are thus used as fastening means for two different mounting parts 1, 7.

Figure 10A:
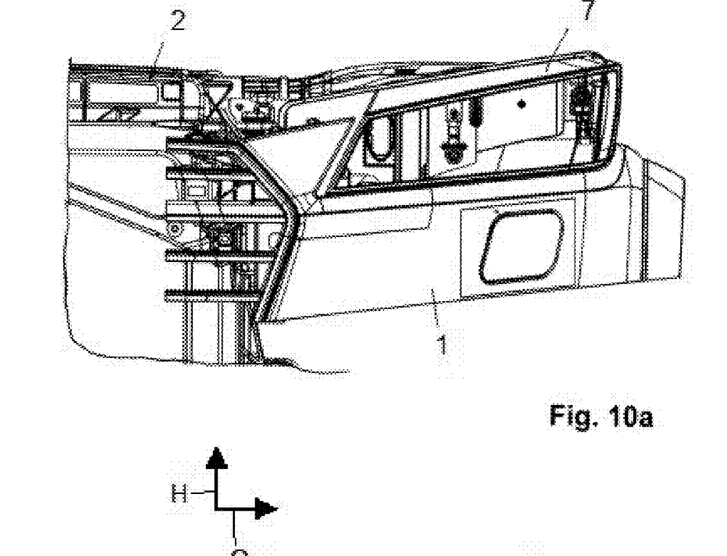
FIG. 10a shows a front view of the holding unit inserted into the mounting structure in an upper position having a bumper cover fastened to the holding body and a headlight housing receptacle as mounting parts.
Figure 10B:
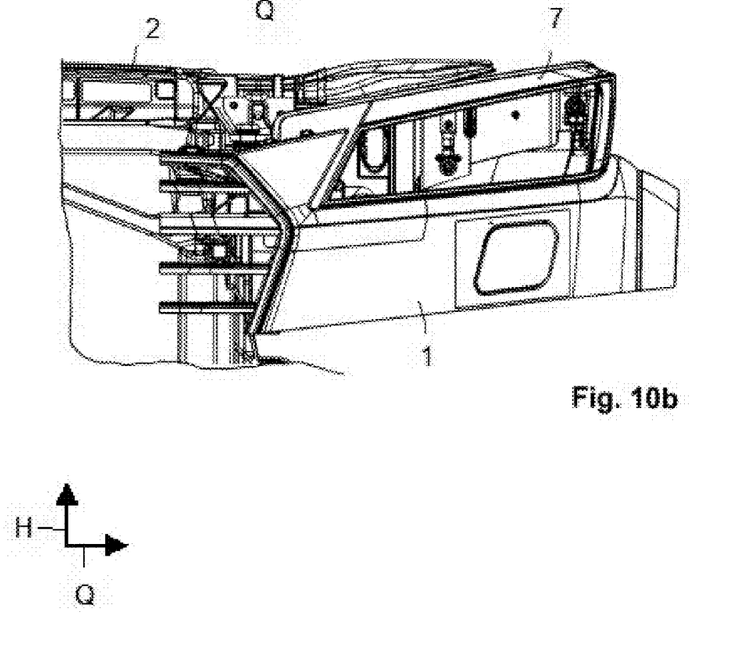
FIG. 10b shows a front view of the holding unit inserted into the mounting structure in a lower position of the holding body having the bumper cover fastened to the holding body and the headlight housing receptacle.

The threaded pin 9 is used as an alignment means for the bumper cover 1 already fastened to the holding body 8 and the headlight housing receptacles 7 with respect to a further mounting part of the vehicle body, namely the engine bonnet, not shown. Before the alignment of the bumper cover 1 and the headlight housing receptacles 7 relative to the engine bonnet 8, the headlight housing receptacles 7 can already be pre-positioned on the mounting structure 2, wherein elongate hole guides preferably extending in the vertical direction H of the vehicle allow displacement of the headlight housing receptacle 7 in the vertical direction H of the vehicle relative to the mounting structure 2.

The holding unit 3 can be attached to the mounting structure 2 before or after the mounting structure 2 is fastened to the vehicle body.

In order to mount the holding unit 3 to the mounting structure 2, in a first step the holding body 8 together with the threaded pin 9 in threaded engagement is supplied to the mounting structure 2 in the normal direction with respect to the apertures 15, 21, 22. The apertures 21, 22 have extensions in the upper region so that the laterally protruding guide hooks 17, 18 can be inserted through the apertures 21, 22 and engage behind the edges 19 or 20 after displacement of the holding body 8 downwards in the vertical direction H of the vehicle. The bearing recess 11 has, on the upper side, a formation 33 corresponding to the threaded head 27 so that when inserting the holding body 8 the threaded pin 9 can be moved into a central position of the bearing recess 11. The holding body 8 is displaced downwards so far until the rim 28 of the threaded pin head 27 comes to lie against the intermediate wall 16. Then, in a second step, the fixing element 10 is inserted into the bearing recess 11 until the ends 25 of the latching arms 24 latch on the rear side of the bearing recess 11.

The fixing element 10 has, on a lower side, an aperture adapted to the height of the threaded pin head 27 so that during insertion it can extend over the threaded pin head 27. The holding unit 3 is now in a mounting position which corresponds to a dead centre position for the mounting parts 1, 7 to be attached. The main body 23 of the fixing element 10 is now located coaxially with respect to the threaded bore 13 and the threaded pin 9.

Then, successively or simultaneously, the bumper cover 1 is attached or mounted to the first fastening point 30 and the headlight housing receptacle 7 is attached or mounted to the second fastening point 31. In a further method step, by actuating the threaded pin 9 by means of a tool the holding body 8, together with the attached bumper cover 1 and the headlight housing receptacle 7, can be displaced in the vertical direction H of the vehicle so far until there is a desired joint spacing of the bumper cover 1 or of the headlight housing receptacles 7 with respect to the engine bonnet. Then, the bumper cover 1 and the headlight housing receptacles 7 are fixed to the mounting structure 2 via fastening means, not shown.

In accordance with an alternative embodiment, the headlight housing receptacles 7 can also be pre-positioned on the mounting structure 2 after fastening the mounting structure 2 to the vehicle body.

The mounting structure 2 and the holding body 8 and the insertion element 10 preferably consist of a synthetic material or a synthetic composite material.

The invention claimed is:

1. A device aligning mounting parts on a mounting structure fastened to a vehicle body, the vehicle body extending in a longitudinal direction, a transverse direction, and a vertical adjustment direction (H), the mounting structure extending in the transverse direction of the vehicle, the device comprising
a holding unit fastened to the mounting structure,
fastening means for attaching at least one mounting part to the holding unit
alignment means via which the holding unit can be aligned relative to a further mounting part in the vertical adjustment direction (H),
wherein as alignment means a linear control element in the form of a threaded pin (9) is provided which is connected to the mounting structure (2) in an axially-secure manner and is adjustable in the adjustment direction (H) relative to a holding body (8) of the holding unit (3) engaged with the threaded pin (9),
wherein the fastening means (30, 31) is arranged at a location remote from the threaded pin (9), and
wherein the threaded pin (9) in a mounting position is held in an axially-secure manner on the mounting structure (2) with a head (27) of the threaded pin (9) bearing against a fixing element (10), and by means of a shaft (14) is in threaded engagement with the holding body (8) via a threaded bore (13) in the holding body.

2. The device as claimed in claim 1, wherein the fixing element (10) is arranged in a latching manner in a bearing recess (11) of the mounting structure (2).

3. The device as claimed in claim 2, wherein the head (27) of the threaded pin (9) is surrounded between the fixing element (10) inserted into the bearing recess (11) on the one hand and a wall (16) of the mounting structure (2) extending transversely to the vertical adjustment direction (H) on the other hand such that the threaded pin (9) can be rotated by attaching a tool to the head (27) thereof.

4. The device as claimed in claim 1, wherein the mounting structure (2) has guide means (15, 21, 22) so that the holding body (8) is guided in a displaceable manner in the vertical adjustment direction (H).

5. The device as claimed in claim 4, wherein the mounting structure (2), as guide means, has at least one of
at least two apertures (21, 22), a surface of the holding body (8) lying against an edge (19, 20) of the guide means so as to be displaceable in the vertical adjustment direction (H) and
guide hooks (17, 18) integrally formed on the holding body (8) engaging behind an edge (19, 20).

6. The device as claimed in claim 4, wherein the guide means (19, 20) of the mounting structure (2) are formed such that the holding body (8) is mounted in a rotationally-fixed manner with respect to the vertical adjustment direction (H) of the vehicle.

7. The device as claimed in claim 1, wherein provided on the holding body (8) are a first fastening point (30) for fixing a first mounting part (1) and a second fastening point (31) for fixing a second mounting part (7).

8. The device as claimed in claim 1, wherein a reinforcement part (32) is integrally formed on the holding body (8) and engages into a recess of the first mounting part (1) for reinforcing said first mounting part (1).

9. The device as claimed in claim 1, wherein a holding unit (3) is adapted to be mounted on the mounting structure (2) on each of opposite end regions of the mounting structure.

10. The device as claimed in claim 1, wherein the first mounting part (1) is a bumper cover and the second mounting part (7) is a headlight housing receptacle,
said holding unit comprising a holding body to which a first mounting part and a second mounting part are fixed at least in the adjustment direction so that by adjusting the control element in the adjustment direction the first mounting part and the second mounting part are simultaneously aligned with respect to a further mounting part of the body.

11. A method for aligning at least two mounting parts on a mounting structure fastened to a vehicle body, the vehicle body extending in a longitudinal direction, a transverse direction, and a vertical adjustment direction (H), the method comprising
mounting a holding unit (3) comprising a holding body (8) on each of opposite ends of the mounting structure (2),
attaching a first mounting part and a second mounting part to the holding body (8), fixed at least in the adjustment direction, mounting parts via the holding unit to the mounting structure extending in the transverse direction of the vehicle and fastened to the body, and
actuating a control element in the vertical adjustment direction (H), so that by adjusting the control element the first mounting part and the second mounting part are simultaneously aligned with respect to a further mounting part of the body, wherein the control element is a linear control element in the form of a threaded pin (9) connected to the mounting structure (2) in an axially-secure manner and adjustable in the vertical adjustment direction (H) relative to a holding body (8) of the holding unit (3) engaged with the threaded pin (9), wherein the threaded pin (9) in a mounting position is held in an axially-secure manner on the mounting structure (2) with a head (27) of the threaded pin (9) bearing against a fixing element (10), and by means of a shaft (14) is in threaded engagement with the holding body (8) via a threaded bore (13) in the holding body, and wherein
each holding unit comprises a holding body (8) to which a first mounting part (1) and a second mounting part (7) are fixed at least in the vertical adjustment direction (H) so that by adjusting the control element (9) in the vertical adjustment direction (H) the first mounting part (1) and the second mounting part (7) are simultaneously aligned with respect to a further mounting part of the body.

12. The method as claimed in claim 11, wherein the second mounting part is pre-positioned on the mounting structure (2) before the mounting structure (2) is fastened to the body.

13. A device aligning mounting parts on a vehicle body, the vehicle body extending in a longitudinal direction, a transverse direction, and a vertical adjustment direction (H), and the device having
a mounting structure oriented extending in the transverse direction of the vehicle to which mounting structure parts are to be mounted,
a holding unit fastened to the mounting structure, to which holding unit at least one mounting part can be attached via fastening means and aligned via aligning means relative to a further mounting part in an adjustment direction,
wherein as alignment means a linear control element in the form of a threaded yin (9) is provided which is connected to the mounting structure (2) in an axially-secure manner and is adjustable in a vertical adjustment direction (H) relative to a holding body (8) of the holding unit (3) engaged with the linear control element (9), wherein the fastening means (30, 31) is arranged at a location remote from the alignment means (9), and wherein a head (27) of threaded pin (9) bears against a fixing element (10), and by means of a shaft (14) is in threaded engagement with the holding body (8) via a threaded bore (13) in the holding body.

\* \* \* \* \*